United States Patent [19]

Dewey et al.

[11] Patent Number: 5,652,887

[45] Date of Patent: Jul. 29, 1997

[54] DYNAMIC META COMMANDS FOR PERIPHERAL DEVICES

[75] Inventors: Douglas William Dewey; William Mark Doumas, both of Tucson, Ariz.

[73] Assignee: International Business Machines Corporation, Armonk, N.Y.

[21] Appl. No.: 455,593

[22] Filed: May 31, 1995

Related U.S. Application Data

[63] Continuation of Ser. No. 263,812, Jun. 22, 1994, abandoned.

[51] Int. Cl.⁶ .................................................. G06F 9/44
[52] U.S. Cl. .......................... 395/683; 395/685; 395/712
[58] Field of Search .................................. 395/683, 684, 395/685, 680, 712, 652

[56] References Cited

U.S. PATENT DOCUMENTS

| | | | |
|---|---|---|---|
| 3,631,405 | 12/1971 | Hoff et al. | 340/172.2 |
| 4,731,736 | 3/1988 | Mothersole et al. | 364/DIG. 2 |
| 4,837,764 | 6/1989 | Russello | 371/20 |
| 4,853,872 | 8/1989 | Shimo | 364/300 |
| 5,268,928 | 12/1993 | Herh et al. | 375/8 |
| 5,488,723 | 1/1996 | Baradel et al. | 395/683 |
| 5,497,491 | 3/1996 | Mitchell et al. | 395/683 |
| 5,519,875 | 5/1996 | Yokoyama et al. | 395/683 |
| 5,530,864 | 6/1996 | Matheny et al. | 395/700 |

*Primary Examiner*—Kevin A. Kriess
*Attorney, Agent, or Firm*—Charles E. Rohrer

[57] ABSTRACT

A system for enabling expanded instruction sets, applications, data and parameters to be downloaded from one processor to another so that processors ordinarily intended for specific tasks can run other tasks without having an expanded instruction set and application code specifically developed or always resident. In an exemplary embodiment, four types of extended commands are issued by the system processor to the peripheral processor in which a command table is built to point to interpretable images resident therein. The interpretable image is downloaded by a first command and contains the executable code and parameters needed to perform the downloaded task. A second command is issued to execute the interpretable image and may include additional data. A third command is provided to delete previously downloaded interpretable images, and a fourth command is provided to enable the system processor to query other processors for resident interpretable images.

37 Claims, 5 Drawing Sheets

DYNAMIC META COMMANDS FOR PERIPHERAL DEVICES

This is a continuation of application(s) Ser. No. 08/263,812, filed on Jun. 22, 1994, now abandoned.

This invention relates to a system organization for utilizing the processing power of peripheral devices to perform system control operations.

BACKGROUND OF THE INVENTION

It is increasingly common for several microprocessors to be connected together within a system in which one of the processors acts as a system control processor and performs system functions. The other microprocessors are associated with specific devices and control those devices to perform specific device functions at the direction of the system control processor. An example of such a system is a storage arrangement in which several storage subsystems are interconnected. Each of the subsystems is under the control of the its own microprocessor with each of those processors having a command instruction set oriented toward storing and retrieving data from a specific storage device. The system itself typically has a control processor with a command instruction set for performing a variety of system tasks including interfacing with the storage device processors within the system and interfacing with a host system to perform storage operations requested therefrom.

It has been observed that while the system control processor and some peripheral device processors are performing work, other peripheral device processors may have a lower workload. It is therefore desirable to provide a system in which work done by the system control processor can be transferred to one of the subsystem processors with a lower workload. However, to do that, the subsystem processor must have a command instruction set like the control processor, and it must have the applications which are performed by the control processor. To provide a system in which all of the subsystem processors have the same processing power, the same command instruction set, and the same applications that are normally at the control processor is an expensive and inefficient solution. It is the object of this invention to provide a system which has the capability of downloading applications from a system control processor to a chosen subsystem processor with all of the application code, data, parameters and that portion of the system command instruction set needed to perform the application so that the subsystem processor need not be permanently modified to perform the application.

SUMMARY OF THE INVENTION

This invention involves the provision of new commands for each processor associated with each subsystem so that those subsystem processors are capable of performing system control processor operations. Utilization of the new commands by the system processor enable it to download system application code or a portion thereof together with that portion of the system command instruction set needed to perform the system application. These downloaded items, together with appropriate data and parameters, are directed to a specific subsystem. After execution of the system application, the system command instruction set, application code, data and parameters can be removed from the subsystem. In that fashion, having application-specific code and an enlarged instruction set always resident at the subsystem processor is avoided. The invention may operate under standard interface architecture such as the Small Computer Systems Interface (SCSI) which provides an entry point into the subsystem processor code so that system commands and applications can be defined at the subsystem as needed. The inventive system provides the opportunity of downloading only a portion of a system application so that the application can be concurrently executed, if desired.

In an exemplary embodiment, a "Register Meta" command is added to the subsystem processor set of commands so that the subsystem processor can recognize and follow that command. Various specific meta command functions (system applications or portions thereof) are defined by the programmer of the system processor with each specific meta command function including an interpretable image comprised of a portion of the system command instruction set and the executable code for the specific system application, as well as parameter areas and buffers for return values or data. The specific interpretable image with the system commands and executable code, parameters and buffers is downloaded from the system processor to the subsystem processor through use of the Register Meta command. In that manner the interpretable image is caused to be present in the subsystem with system commands without actually changing the subsystem command instruction set to include the system commands. When a Register Meta command is issued to download an interpretable image, the subsystem processor returns to the system processor an integer handle to identify the particular capability added to the subsystem processor. When it is desired to execute the interpretable image, an "Execute Meta" command is issued by the system processor to the subsystem processor utilizing the handle. At that time, additional data may be downloaded for use in performing the function.

In addition to the Register Meta command and the Execute Meta command, it is desirable to add two more meta command functions to the subsystem processor instruction set. These are the "Deregister Meta" command and the "Query Meta" command. The Deregister Meta function allows the system processor to remove a specific meta command from the subsystem. The Query Meta command allows the system processor to obtain information on what specific meta commands are currently downloaded into a specific subsystem.

BRIEF DESCRIPTION OF THE DRAWING

The above-mentioned and other features and objects of the invention and the manner of attaining them will become more apparent and the invention itself will best be understood by reference to the following description of embodiments of the invention taken in conjunction with the accompanying drawing, a brief description of which follows.

DETAILED DESCRIPTION

Figure 1:
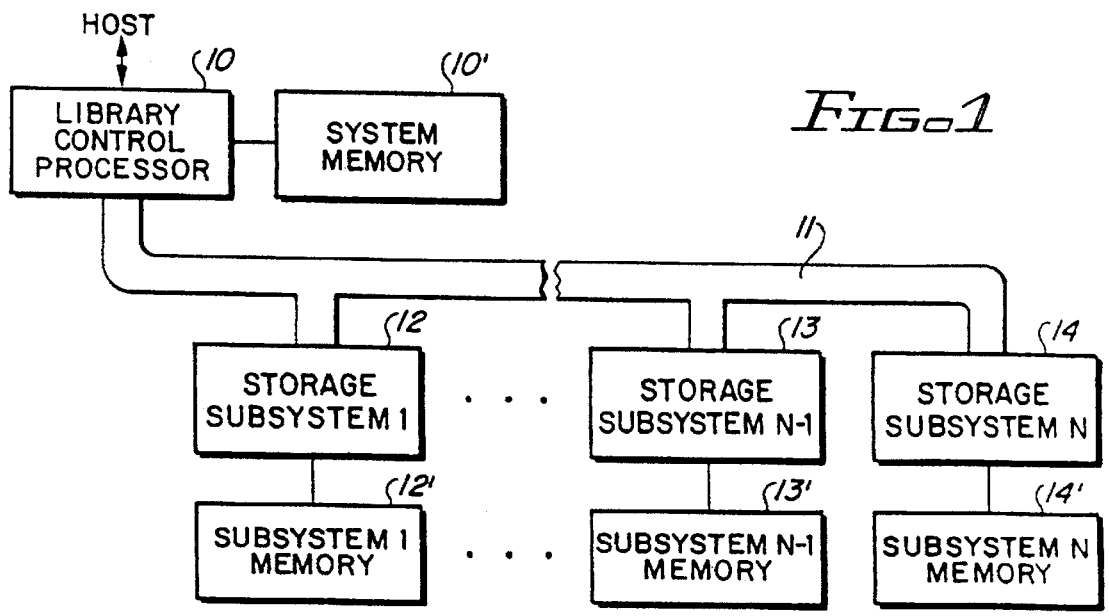
FIG. 1 shows a typical environment in which the invention is utilized.

When reference is made to the drawing, like numerals will indicate like parts and structural features in the various figures.

The invention will be illustrated with respect to an optical library in which a library control processor performs various system operations while multiple optical drives each have a subsystem microprocessor to control the performance of each drive. The object of the invention is to move system functions ordinarily performed by the library processor to subsystem processors so that the library processor is able to perform more efficiently and the library as a whole is enabled to perform more efficiently. The invention is described in a preferred embodiment with the provision of four new commands at the drive processors but does not involve the modification of the drive processors to perform specific system applications. Instead, the system application is downloaded at the time desired from the system control processor to the drive processor together with the system commands, code, data and parameters needed to perform the system application. Additional data may be downloaded when the system application is executed.

FIG. 1 is an illustration of a storage library in which a library control processor 10 is connected over a bus 11 to several storage subsystems processors 12–14. The command instruction set for the storage subsystem processors 12–14 includes the typical commands for writing data to the tape, disk or other media present in the subsystem, a command to read the data from the media, and other commands such as erase, etc. The command instruction set at the library controller 10 may include many other commands so that the processor 10 can perform just about any kind of function, for example add, subtract, move, etc. Consequently, applications resident in system memory 10' at the library controller may include code utilizing many commands which are not present in the storage subsystem microprocessors. To enable the storage subsystem processors 12–14 to perform applications utilizing the command set of the library control processor 10 without changing the command set of the storage subsystem processors to include all of those commands present at the library processor, the exemplary embodiment of the invention adds only four new commands to the subsystem processor set of commands. These four commands are preferably added to the command set of each of the storage subsystem processors so that any of them can be chosen to perform a system operation when its workload is low. In that manner, a system application or portion thereof can be transferred to subsystem memory 12', 13' or 14' for execution at the request of system processor 10. Execution of the system application may be entirely at the chosen subsystem or it may be executed concurrently with the system processor.

A first new command is the Register Meta command which allows the library controller to download application specific meta commands created by a programmer from the library controller to the storage subsystem. A second new command is the Execute Meta command which directs the storage subsystem processor to execute a specific system application. The executable code that is downloaded with the Register Meta command could be assembly or machine code for the particular microprocessor. The register command, in such case, functions like a standard linker/loader and the execute command would invoke the downloaded code directly. In the preferred embodiment presented here a generic assembly language would be defined and the subsystem interprets the image.

The technique used in the embodiment for adding the meta commands to the storage subsystems is to utilize the entry point provided by a standard hardware interface such as SCSI. For purposes of illustration, a single generic command, "Device Control" is defined and used herein. This is representative of a typical command that may exist in any hardware interface and is present to allow a device to add extra commands to a standard interface. The invention is not specific to any particular hardware interface. By using a generic single entry point that is similar to existing entry points in existing standards, the invention is illustrated for any standard. The device control function is defined as follows:

Device_Ctl (func, parm_list_addr, sz_parm_list, trans_buffer_addr, sz_trans_buffer)

Where:

func
    Integer value to indicate which drive command to perform parm_list_addr
    Address of buffer containing parameters to the command to be performed. These parameters will vary with the function being indicated by func.

sz_parm_list
    Size of the buffer pointed to by parm_list_addr. trans_buffer_addr Address of buffer to transfer data to or from the call.

sz_trans_buffer
    Size of the buffer pointed to by trans_buffer_addr.

In the exemplary embodiment, the four extended commands invoked through the entry point are:

Register Meta Function

Allows the system control processor to download meta commands. Specified by calling Device_Ctl with:

Input:
    func=Register_M where Register_M is some agreed upon integer value identifying the request to load the transfer buffer as a meta command.
    trans_buffer_addr buffer contains the Interpretable Image (see explanation below) of the meta command being downloaded.
    parm_list_addr buffer contains the following:
        a) ID—meta command identifier;
        b) num_p—number of parameters to the meta command—assume that all parameters are the same size;
        c) ii_size—size of an interpretable image; and
        d) ip_start—Instruction pointer start relative to the beginning of the interpretable image to begin interpretation of the meta command.

Output:
    handle to the created meta command is returned in trans_buffer_addr buffer.

Execute Meta Function

Input:
    func=Execute_M which is some agreed upon integer value identifying that a meta function is to be executed. The Parm_list_addr is the address of a buffer that contains the handle returned when the meta command was registered. This handle specifies which meta command is to be executed. The rest of the contents of parm_list_addr buffer will be "passed" to the interpretable image as parameters to the meta command. Likewise the trans_buffer_addr buffer may contain input data that is accessed by the meta command during execution but this will depend on the meta command itself.

Output:
Unless directed otherwise by the meta command itself, the meta command output will be placed in the trans_buffer_addr buffer.

Deregister Meta Function

Allows the system control processor to remove a meta command. Specified by calling Device_Ctl with:

Input:
Func=Deregister_M, where the Parm_list buffer contains the handle of the meta command to be removed.

Output:
None.

Query Meta Function

Allows the system control processor to get information on what meta commands are currently downloaded. Specified by calling Device_Ctl with:

Input:
func=Query_M, other parameters ignored.

Output:
Information on the currently registered commands is returned in trans_buffer_addr buffer.

The application specific meta commands may be coded in a generic assembly language or other predefined language that is capable of interpretation by the microcode incorporated into the peripheral device processor. In exercising a specific meta command function, an interpretable image for that function is created by the programmer and resides in the system control processor. Prior to invoking it, the interpretable image is downloaded to the microprocessor in the peripheral device by utilizing the Register Meta function. The microcode in the microprocessor of the peripheral device is able to interpret the interpretable image and does so at the request of the system processor when the system processor issues an Execute Meta command. In that manner, the subsystem operating code performs in accordance with the interpretable image even though it is unaware of the function being carried out by the interpretation. The interpretable image itself contains the code of the application specific meta function along with its own parameter areas and its own buffer space.

Figure 2:
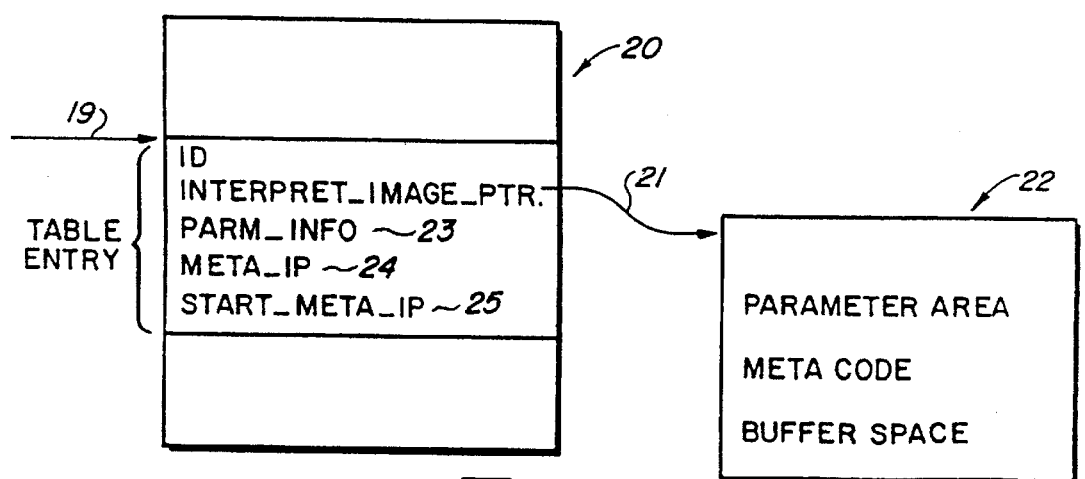
FIG. 2 shows the meta command table built at a peripheral processor for implementing the invention by pointing to specific interpretable images.

FIG. 2 illustrates the meta commands table 20 built within the storage subsystem through the Device Control command. When a particular interpretable image is downloaded in accordance with the exercise of the Register Meta command, the address of the interpretable image is included as a pointer 21 in the meta commands table. When an Execute Meta command is received for that particular function (handle 19), the pointer 21 provides the address of the interpretable image 22 which is then executed by the microprocessor. By using a single interpretable image for each application specific meta function, relative byte addressing can be used to pick up parameters and access variables in the buffer space as shown in FIG. 2. This enables a straightforward interpretation of the meta code. The meta code language definition allows calls to existing commands within the subsystem such as, for example, read logical block or write logical block. So, in the process of interpreting the meta code, standard calls to existing commands within the subsystem can be made and, upon completion, the results returned to the meta code buffers. Hence the downloaded commands within the interpretable image can invoke existing commands within the subsystem instruction set and therefore they are termed meta commands.

Figure 3:
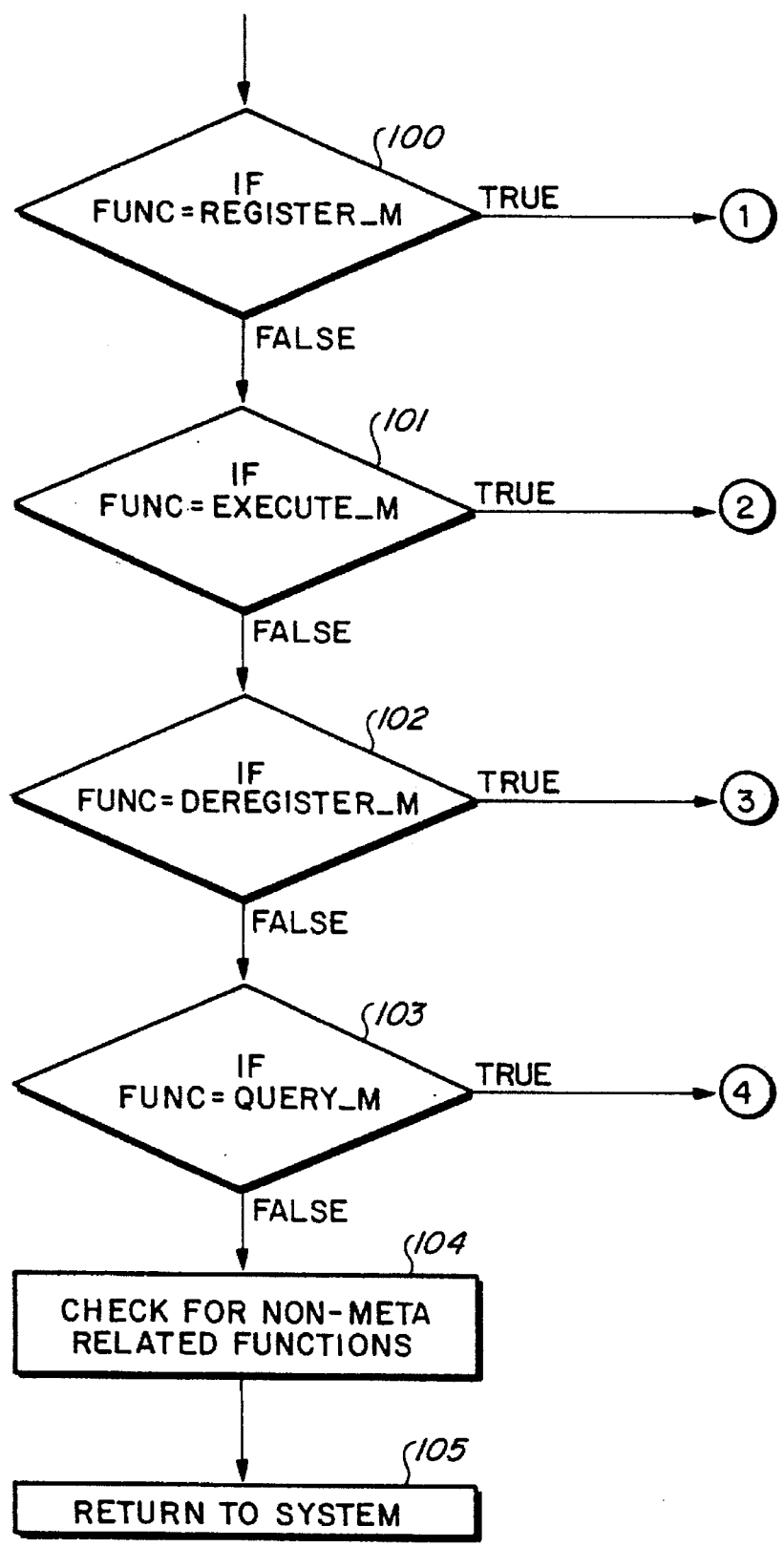
FIG. 3 is the basic control procedure for recognizing the meta command at the subsystem processor.

FIG. 3 shows the utilization of the Device Control command to perform any of the four extended commands. When the Device Control command is issued and a Register Meta command is to be performed, as shown in step 100, a branch is made to FIG. 4 for continuation of the procedure. If an Execute Meta command is to be performed, a branch is taken at step 101 to FIG. 5 for the remaining steps of the procedure. If a Deregister Meta command is to be performed, a branch is taken at step 102 to FIG. 6 for the remaining steps of the procedure. Finally, at step 103, if a Query Meta command is to be performed, a branch is taken to FIG. 7 for continuation of the remaining steps of the procedure. If none of the preceding branches are taken, a check is made at step 104 for non-meta related functions.

Figure 4:
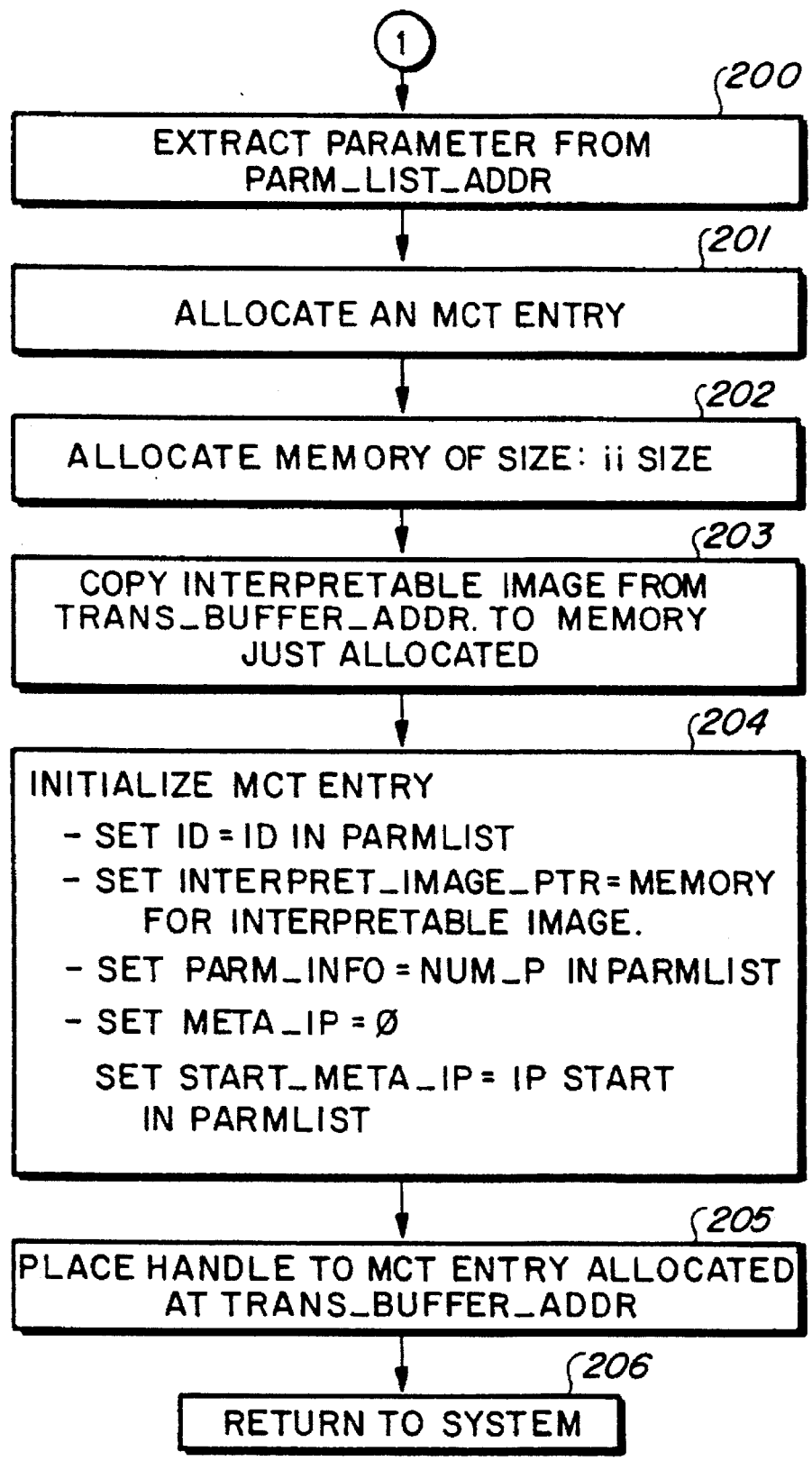
FIG. 4 is the procedure for building a meta command table at the subsystem processor to point to interpretable images.
Figure 5:
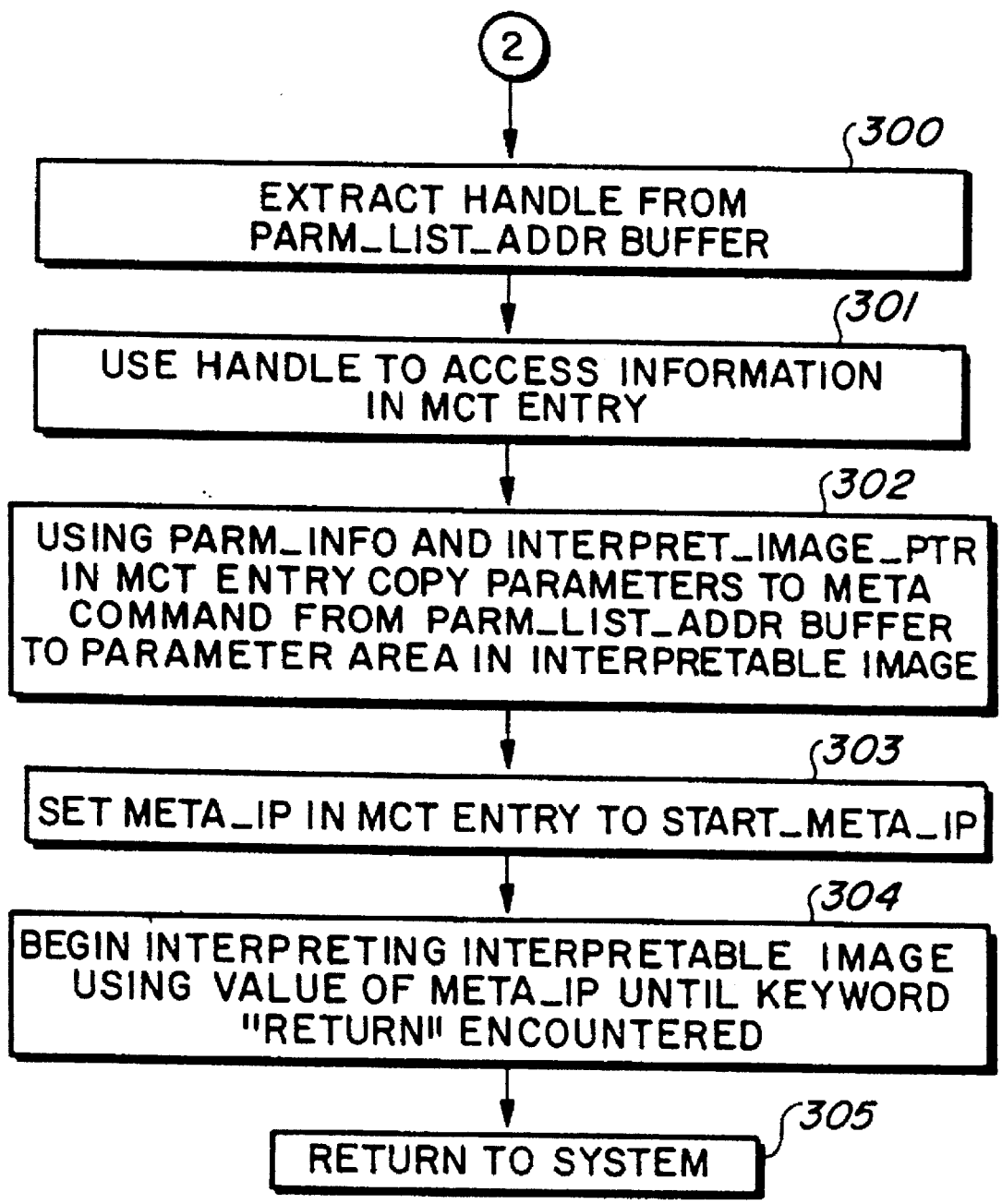
FIG. 5 is the procedure for executing the interpretable image.

FIG. 4 shows those steps which are exercised in performing the Register Meta command function. Basically, the operation performed in FIG. 4 is to create an entry into the meta commands table for the particular meta command being registered. Thus, at step 200 parameters are extracted from the parameter list address field of the Device Control command and placed into the parameter information field of the meta commands table shown at 23 in FIG. 2. As mentioned above, one of the data fields in the parameter list address buffer is the number of parameters to the meta command. With that information, and assuming that all parameters are the same size, space can be allocated for the parameters needed to exercise that particular meta command. At step 201, allocation of the space is performed. At step 202, allocation of space to contain the interpretable image is performed. At step 203, the interpretable image is copied from the transfer buffer to the memory just allocated. The meta command table is initialized at step 204, and an integer handle to the meta command table entry is placed in the transfer buffer at step 205 for transferring back to the system control processor. Return to the system is made at step 206. By constructing the meta command in the fashion shown in FIG. 4, all that need be done to execute an interpretable image is to send the handle for that specific meta command function to the subsystem device which contains the interpretable image together with whatever data is expected by the meta command. Thus, in FIG. 5, when the meta command function is to be performed, the handle is sent from the host to the subsystem where the handle is extracted at step 300 from the parameter list address buffer of the Device Control command. At step 301, the handle is used to access information for that particular command from the meta command table entry. At step 302, the parameter information and the interpretable image pointer are used to copy parameters to the meta command from the parameter list address buffer to parameter areas within the interpretable image. At step 303, the meta instruction pointer 24 in FIG. 2 in the meta command table 20 is set to the start meta instruction pointer 25 provided by the Device Control command parameter field. At step 304, the interpretable image is interpreted until the key word "return" is encountered. At that point, the return is made to the system control processor at step 305. Note that step 304 may involve reading data from the transfer buffer and writing results to the transfer buffer.

Figure 6:
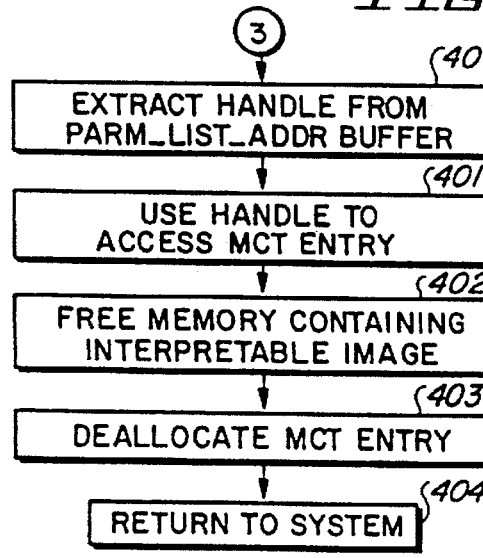
FIG. 6 is the procedure for removing interpretable images and meta command entries in the meta command table.

FIG. 6 shows the performance of a Deregister Meta command in which the handle for that command is extracted from the parameter list address buffer at step 400. The meta command entry specified is accessed at step 401, and at step 402 memory containing the interpretable image is freed. At step 403 the meta command table entry is de-allocated and return to the system control processor is made at step 404.

Figure 7:
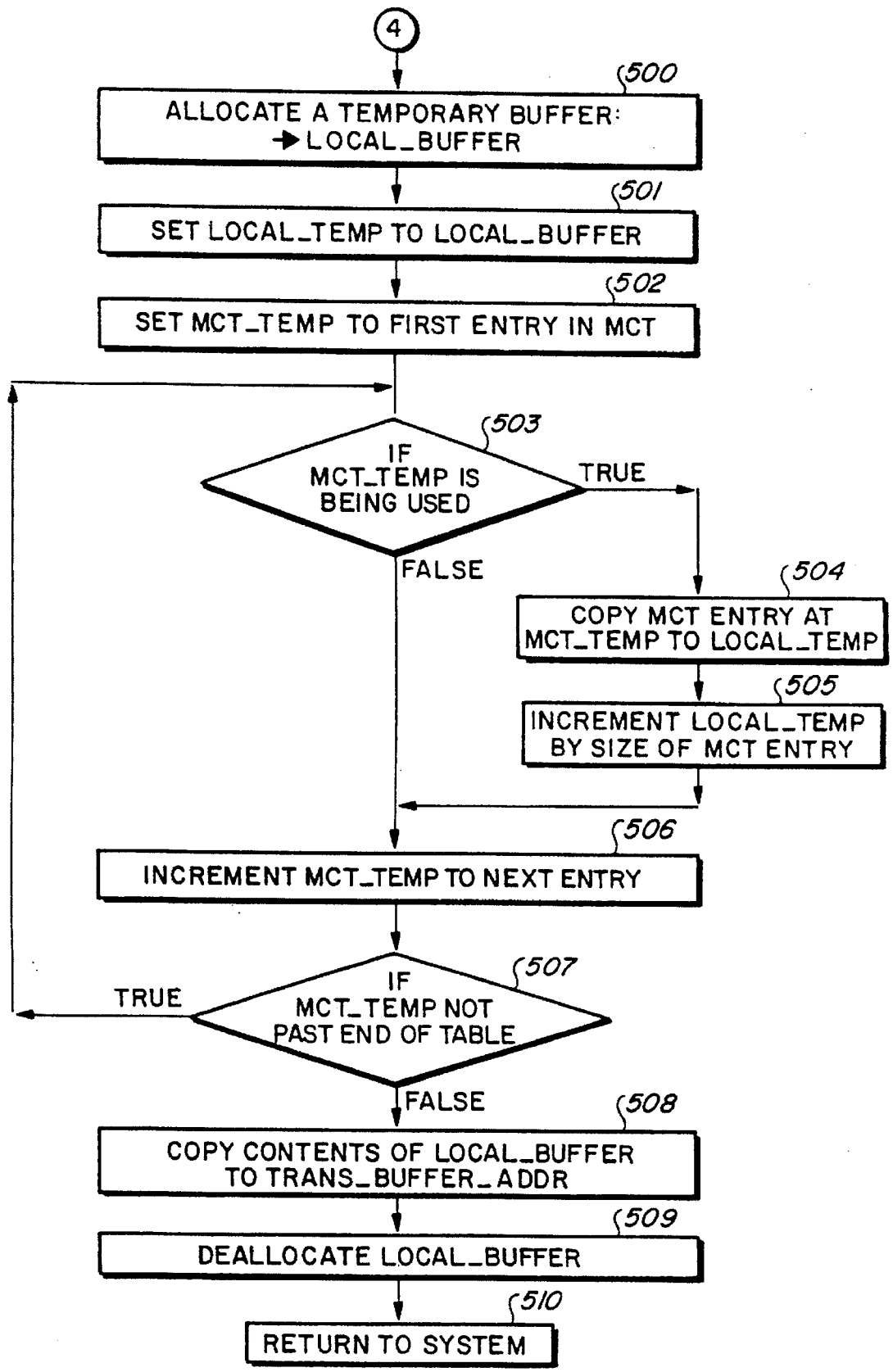
FIG. 7 is the procedure for querying a subsystem processor on the meta functions currently resident therein.

The Query Meta command function is illustrated in FIG. 7. At step 500, a local temporary buffer is allocated. At steps 501 and 502, an address parameter "MCT temporary" is established as pointing to the first entry in the meta command table while the address of the local temporary buffer is established as a pointer to the local buffer allocated in step 500. At step 503, a branch is made to step 504 for copying the first MCT entry at the address of MCT temporary into the local temporary buffer. At step 505 the local temporary parameter is incremented by the size of the meta command table entry for that first meta command in the table. At step 506 the parameter "MCT temporary" is incremented to point to the next entry in the table. At step 507 a branch is made back to step 503 to repeat the procedure if the MCT temporary parameter does not point to the end of the table. Once the end of the table is reached, a branch is taken at step 507 to step 508 for copying the contents of the local buffer into the transfer buffer. At step 509 the local buffer space is de-allocated and return to the system control processor is made at step 510.

To illustrate the invention the meta command find last node will be used. This command is an actual function of a file system located in the system processor designed to run on Write Once Read Many (WORM) optical drives. Without this invention it runs on the library system processor and issues successive read commands to the peripheral device until the last node is found. Its function is to locate the last node in a chain that is laid out on the optical disk. This chain is a simple linked list where each node is 32 contiguous sectors of data with the pointer to the next node located in the last sector of the previous node. Since this is a WORM structure the file system has the location of the first node and must continually read nodes to find the last one. A blank sector in the last node serves as the current end of chain marker.

The find last node function takes a starting address as input and returns a buffer containing the contents of the last node. The logic is as follows:
 a) Set disk_address to starting address;;
 b) Initialize a buffer;
 c) While No Error from Read
   1) Read from drive at disk_address into buffer,
   2) If Blank check from Read Return buffer to caller
   3) Set disk_address to address of next node. This address is found at the end of buffer.
 d) Return Error to caller.

When this function runs in the library system processor as is the current practice, the system processor requests the drive processor to read a first node beginning at the starting address and return that node. When that has been accomplished, the system processor inspects the last sector to obtain the address of the next node. If found, a second read is issued by the system processor to request the drive to read the next node and return that node. The system processor inspects the last sector to obtain the address of the next node. The process continues until the inspection of the last sector by the system processor finds no next pointer, thereby finding the "last node" written on the disk.

It should be observed that the above process involves heavy bus traffic between the system processor and the device processor in that successive data transfers of nodes each 32 sectors in length occurs interspersed with issuance of several read commands until the last node has been transferred. Each read command from the system processor generates SCSI bus call to the drive that moves up to 32K of data over the bus. The library control processor is used to execute the algorithm which is part of the file system code in the library control processor.

In this invention, the above algorithm is programmed in the meta code language instead of as part of the file system.

The meta code picks up the starting address from the parameter area at the beginning of the interpretable image. It uses the buffer space at the end of the interpretable image for buffer. Having created the interpretable image, the system proceeds as follows:

1. As a last step in initialization after boot up, the file system in the system processor issues the Query Meta Function by calling the drive with Device_Ctl and func equal to Query_M. After boot up this command will come back indicating there are no meta commands registered.
2. The file system now registers the find_last_node command with the following steps:
   a) The previously coded interpretable image is loaded into the transfer buffer at the trans_buffer_addr.
   b) func is set to Register_M.
   c) Parmlist_addr buffer is loaded with the ID given to find_last_node, num_p set to 1 for the one parameter find_last_node takes as input, ii_size set to the size of the interpretable image and ip_start set to the value needed to begin execution of the interpretable image.
   d) The file system calls the drive Device_Ctl with the parameters set above.
   e) The drive registers the command according to the flow chart shown in FIG. 4.
   f) The file system extracts the handle for find_last_node from trans_buffer_addr upon return from the drive.
   g) The file system saves the handle.
3. In the course of normal execution the file system reaches a point where it would have called find_last_node and instead uses the meta command with the following steps.
   a) It retrieves the handle for find_last_node.
   b) It calls Device_Ctl with the following parameters func set to Execute_.
     parm_list_addr containing the handle followed by the starting disk address
   c) The hardware interface transfers the buffers to the drive and the drive begins executing the Execute_eta command operation with the following steps:
     The handle is extracted from parm_list_addr buffer to locate the MCT entry for find_last_node.
     Using the information in the MCT the drive sees that only one parameter needs to be copied from parm_list_addr and copies the starting disk_addr from parm_list_addr to the parameter area in the interpretable image.
     It begins interpreting the interpretable image by setting up the meta_ip (instruction pointer) and fetching and interpreting commands from the interpretable image.
       As the image is interpreted several read commands are issued to the existing drive code and data is moved into the buffer in the buffer area of the interpretable image.
       The meta code upon receiving a blank check has found the last node. The contents of the buffer are moved to the trans_buffer_addr buffer and a return is made to the system processor.
4. The file system returns from the Device_Ctl call with the last node in trans_buffer_addr and continues processing as before.

Note that when this function is performed without the use of meta commands, the library control processor is used to search the list and multiple large data transfers occur over the bus from the peripheral. When used as a meta command the library controller is freed to perform other activities. The search is performed by the drive processor and when complete only one data transfer over the bus occurs. In a concurrent environment such as an optical library where multiple drives are in use on a single bus, both the reduced bus activity and reduced library control processor load provide significant performance enhancement.

Particular file system functions that are good candidates for downloading as a meta function for performance by a device processor include those functions which are characterized by searches of the disk that require repeated exchanges between the file system and the peripheral processor. Moving these operations would shorten code paths in the system processor and reduce bus traffic.

Other good file system candidates include: routines for reading and writing with swapping of bytes from one format to another; routines to update directory entries; allocation functions operating on bitmaps; writing a buffer to plural storage locations; and incrementing counters in file system control blocks.

The above examples all involve file system work. The invention, however, is general and allows the system controller to move other types of work to utilize otherwise idle processing capacity in a distributed processing approach.

While the invention has been described above with respect to specific embodiments, it will be understood by those skilled in the art that various changes in form and details may be made therein without departing from the spirit and scope of the invention. For example, the exemplary embodiment illustrates the use of four new extended commands. An equivalent is one new command with various modes of operation.

What is claimed is:

1. In a system in which system control includes a system control processor, said processor connected to one or more subsystem processors, said system control processor having a system command instruction set for performing system functions and said one or more subsystem processors having limited command instruction sets for performing subsystem functions, the computer implemented method of moving a system function from said system processor to a subsystem processor incapable of performing said system function to enable the future execution of said system function by said subsystem processor, comprising the steps of:

building a specific meta command in said system control comprised of an interpretable image, said image comprised of at least a portion of the executable code of a system application for performing a specific system function and a portion of the system command instruction set needed to execute the system application;

adding a register meta command to the subsystem processor set of commands for enabling the subsystem to accept specific meta commands; and downloading said interpretable image from said system control to a selected subsystem for future execution by registering said specific meta command in said selected subsystem wherein the interpretable image is loaded into said selected subsystem.

2. The method of claim 1 further including the step of adding an execute meta command to the subsystem processor set of commands for enabling the subsystem to execute a previously registered specific meta command when requested by said system processor.

3. The method of claim 1 wherein said step of building a specific meta command comprised of an interpretable image further includes building a parameter area in said interpretable image to include parameters needed to execute the system application and building a buffer area in said interpretable image to receive data for executing said system application.

4. The method of claim 3 further including the step of adding an execute meta command to the subsystem processor set of commands for enabling the subsystem to execute a previously registered specific meta command when requested by said system processor.

5. The method of claim 3 wherein said step of downloading said interpretable image includes sending control data to said selected subsystem processor, said control data including a request to load the interpretable image, the address of said parameter area within said interpretable image, the size of the parameter area, the size of the buffer area and the address of a transfer buffer, wherein relative byte addressing may be used within the interpretable image to pick up parameters and access variables.

6. The method of claim 5 further including the step of adding an execute meta command to the subsystem processor set of commands for enabling the subsystem to execute a previously registered specific meta command when requested by said system processor.

7. The method of claim 5 further including the step of building a command table within the selected subsystem including control data comprising a unique identifier for said interpretable image, the address in subsystem memory for said interpretable image and a pointer to the first command to be executed within said interpretable image.

8. The method of claim 7 further including the step of adding an execute meta command to the subsystem processor set of commands for enabling the subsystem to execute a previously registered specific meta command when requested by said system processor.

9. The method of claim 8 further including the step of adding a query meta command to the subsystem processor set of commands for enabling the subsystem to list all specific meta commands registered in said subsystem by copying the contents of said command table into a transfer buffer for transfer to said system processor.

10. The method of claim 1 further including the step of adding a query meta command to the subsystem processor set of commands for enabling the subsystem to list all specific meta commands registered in said subsystem.

11. The method of claim 1 further including the step of adding a deregister meta command to the subsystem set of commands to enable the deletion of a specific meta command by removing the interpretable image from subsystem memory.

12. The method of claim 9 further including the step of adding a deregister meta command to the subsystem set of commands to enable the deletion of a specific meta command by removing the interpretable image from subsystem memory deleting its entry in said command table.

13. The method of claim 1 further including the step of building a command table within the selected subsystem including control data comprising a unique identifier for said interpretable image, the address in subsystem memory for said interpretable image and a pointer to the first command to be executed within said interpretable image.

14. The method of claim 13 further including the step of adding a query meta command to the subsystem processor set of commands for enabling the subsystem to list all specific meta commands registered in said subsystem by copying the contents of said command table into a transfer buffer for transfer to said system processor.

15. The method of claim 14 further including the step of adding a deregister meta command to the subsystem set of commands to enable the deletion of a specific meta command by removing the interpretable image from subsystem memory.

16. The method of claim 15 further including the step of adding an execute meta command to the subsystem processor set of commands for enabling the subsystem to execute a previously registered specific meta command when requested by said system processor.

17. A method of improving the efficiency of a distributed computing system, said distributed computing system including system control with a system control processor having a system command instruction set for performing system functions and one or more subsystem processors having limited command instruction sets for performing subsystem functions but incapable of performing system functions, said method comprising the steps of:

providing for the building of a specific meta command in said system control comprised of an interpretable image, said image comprised of at least a portion of the executable code of a system application for performing a specific system function and a portion of the system command instruction set needed to execute the system application;

providing for the addition of a register meta command to the subsystem processor set of commands for enabling the subsystem to accept specific meta commands to provide for the downloading of said interpretable image from said system control to a selected subsystem for future execution by registering said specific meta command in said selected subsystem wherein the interpretable image is loaded into said selected subsystem.

18. The method of claim 17 further including the step of providing for the addition of an execute meta command to the subsystem processor set of commands for enabling the subsystem to execute a previously registered specific meta command when requested by said system processor.

19. The method of claim 17 wherein said step of providing for the building of a specific meta command comprised of an interpretable image further includes providing for the building of a parameter area in said interpretable image to include parameters needed to execute the system application and providing for the building of a buffer area in said interpretable image to receive data for executing said system application.

20. The method of claim 19 further including the step of providing for the addition of an execute meta command to the subsystem processor set of commands for enabling the subsystem to execute a previously registered specific meta command when requested by said system processor.

21. The method of claim 19 wherein said step of providing for the downloading of said interpretable image includes providing for the sending of control data to said selected subsystem processor, said control data including a request to load the interpretable image, the address of said parameter area within said interpretable image, the size of the parameter area, the size of the buffer area and the address of a transfer buffer, wherein relative byte addressing may be used within the interpretable image to pick up parameters and access variables.

22. The method of claim 21 further including the step of providing for the addition of an execute meta command to the subsystem processor set of commands for enabling the subsystem to execute a previously registered specific meta command when requested by said system processor.

23. The method of claim 21 further including step of providing for the building of a command table within the selected subsystem including control data comprising a unique identifier for said interpretable image, the address in subsystem memory for said interpretable image and a pointer to the first command to be executed within said interpretable image.

24. The method of claim 23 further including the step of providing for the addition of an execute meta command to the subsystem processor set of commands for enabling the subsystem to execute a previously registered specific meta command when requested by said system processor.

25. The method of claim 24 further including the step of providing for the addition of a query meta command to the subsystem processor set of commands for enabling the subsystem to list all specific meta commands registered in said subsystem by copying the contents of said command table into a transfer buffer for transfer to said system processor.

26. The method of claim 17 further including the step of providing for the addition of a query meta command to the subsystem processor set of commands for enabling the subsystem to list all specific meta commands registered in said subsystem.

27. The method of claim 17 further including the step of providing for the addition of a deregister meta command to the subsystem set of commands to enable the deletion of a specific meta command by removing the interpretable image from subsystem memory.

28. The method of claim 25 further including the step of providing for the addition of a deregister meta command to the subsystem set of commands to enable the deletion of a specific meta command by removing the interpretable image from subsystem memory deleting its entry in said command table.

29. The method of claim 17 further including step of providing for the building of a command table within the selected subsystem including control data comprising a unique identifier for said interpretable image, the address in subsystem memory for said interpretable image and a pointer to the first command to be executed within said interpretable image.

30. The method of claim 29 further including the step of providing for the addition of a query meta command to the subsystem processor set of commands for enabling the subsystem to list all specific meta commands registered in said subsystem by copying the contents of said command table into a transfer buffer for transfer to said system processor.

31. The method of claim 30 further including the step of providing for the addition of a deregister meta command to the subsystem set of commands to enable the deletion of a specific meta command by removing the interpretable image from subsystem memory.

32. The method of claim 31 further including the step of providing for the addition of an execute meta command to the subsystem processor set of commands for enabling the subsystem to execute a previously registered specific meta command when requested by said system processor.

33. Distributed computing apparatus wherein a subsystem processor is enabled to perform system functions or portions thereof comprising:

system control means including a system control processor with a system command instruction set for performing system functions;

at least one subsystem control means including subsystem memory and a subsystem command instruction set for performing subsystem functions;

a connection bus connecting said system control processor and said subsystem processor;

an interpretable image means including the executable code of a system application or portion thereof, said interpretable image also including that portion of the system command instruction set needed for executing said executable code; and means for downloading said interpretable image over said bus from said system processor to said subsystem processor, said subsystem processor storing said interpretable image in subsystem memory.

34. The apparatus of claim 33 further including:

means for building a command table in said subsystem memory for holding a pointer to the location of said interpretable image in said subsystem memory; and means for returning a handle identifier to said system processor.

35. The apparatus of claim 33 wherein said system processor further comprises means for issuing a request to execute said interpretable image.

36. The apparatus of claim 33 wherein said system processor further comprises means for issuing a request to delete said interpretable image and its table entry from said subsystem processor memory.

37. The apparatus of claim 33 wherein said system processor further comprises means for issuing a request to said subsystem processor to instruct said subsystem processor to transfer to said system processor a list of interpretable images resident in the memory of said subsystem.

* * * * *

UNITED STATES PATENT AND TRADEMARK OFFICE
CERTIFICATE OF CORRECTION

PATENT NO. : 5,652,887
DATED : July 29, 1997
INVENTOR(S) : Dewey et al.

It is certified that error appears in the above-indentified patent and that said Letters Patent is hereby corrected as shown below: Title page, item [56], References cited should include:

|  | U.S. PATENT DOCUMENTS |  |  |
|---|---|---|---|
| 5,187,793 | 2/93 | Keith et al. | 395/775 |
| 4,972,365 | 11/90 | Dodds et al. | 395/275 |
|  | FOREIGN PATENT DOCUMENTS |  |  |
| EP 436 458 | 7/91 | Europe |  |

Signed and Sealed this

Twenty-third Day of December, 1997

Attest:

BRUCE LEHMAN

*Attesting Officer*     *Commissioner of Patents and Trademarks*